(12) United States Patent
Wakazono

(10) Patent No.: US 7,720,859 B2
(45) Date of Patent: May 18, 2010

(54) DEVICE AND PROGRAM FOR EXECUTING SETTING PROCESS

(75) Inventor: Tomomi Wakazono, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 427 days.

(21) Appl. No.: 11/723,458

(22) Filed: Mar. 20, 2007

(65) Prior Publication Data

US 2007/0226194 A1    Sep. 27, 2007

(30) Foreign Application Priority Data

Mar. 23, 2006  (JP)  ............... 2006-080138

(51) Int. Cl.
*G06F 17/30*  (2006.01)
(52) U.S. Cl. ................. 707/769; 707/999.1; 707/999.2; 715/273
(58) Field of Classification Search .......... 707/769, 707/999.001, 999.1, 999.2; 715/273, 841; 358/1.1, 1.13, 1.14, 1.15
See application file for complete search history.

(56) References Cited

U.S. PATENT DOCUMENTS

2006/0092134 A1*  5/2006  Ohara .................. 345/161

FOREIGN PATENT DOCUMENTS

| JP | 8-137648 | 5/1996 |
|---|---|---|
| JP | 10-207674 | 8/1998 |
| JP | 2002-108816 | 4/2002 |
| JP | 2003-285516 | 10/2003 |
| JP | 2004-145774 | 5/2004 |
| JP | 2004-206553 | 7/2004 |
| JP | 2004-302661 | 10/2004 |
| JP | 2005-165772 | 6/2005 |

OTHER PUBLICATIONS

Japanese Notification of Reasons of Rejection, with English Translation, issued in Japanese Patent Application No. JP 2006-080138, dated Mar. 31, 2009.

\* cited by examiner

*Primary Examiner*—Fred I Ehichioya
(74) *Attorney, Agent, or Firm*—McDermott Will & Emery LLP

(57) ABSTRACT

There is provided a device, which comprises a storage unit configured to store a plurality of items relating to setting of a predetermined device and parameters associated with the plurality of items, a search unit configured to search the storage unit for at least one item that matches a keyword, and a setting screen generation unit configured to generate a setting screen for the setting of the at least one setting item searched by the search unit, using the parameters associated with the at least one item.

17 Claims, 12 Drawing Sheets

FIG. 3

| ID | ITEM NAME | CATEGORY | COMMENTS | RANGE | TYPE | SETTING AND PROCESSING DETAILED TYPE | PARAMETER |
|---|---|---|---|---|---|---|---|
| 11 | TRAY SETTING | TRAY SETTING | TRAY SETTING SCREEN IS OPENED. PAPER SIZE, PAPER TYPE, TRAY PREFERENTIALLY USED FOR PRINTING CAN BE SET | | SETTING | SNMPSet-SettingList | <Setting IDs> 12;13;14;15; <Method> Get(), View(), Send(); |
| 12 | 1st TRAY PAPER SIZE | TRAY SETTING | PAPER SIZE OF FIRST TRAY IS SET. A4,A5,B5,B6,LETTER,LEGAL,POSTCASRD,JISB5,FREE ARE SETTABLE. | A4,A5,B5,B6, LETTER,LEGAL, POSTCASRD, JISB5,FREE | SETTING | SNMPSet-List | <Method> Get(), View(), Send(); <Oid> 1.3.6.1.2.1.43.xx.xx.x <Type>Integer <Values>A4,1;A5,2;A6,3;B5,4;b6,5;Letter,6;Legl,7 ;JISS,8;Post Card,9;Free,10; |
| 22 | 1st TRAY SIZE DEFAULT SETTING | TRAY SETTING | FIRST TRAY PAPER SIZE IS SET TO DEFAULT. DEFAULT PAPER SIZE IS A4 | A4 | SETTING | SNMPSet-NoIF | <Method> Send(); <Oid> 1.3.6.2.1.43.xx.xx <Type>Integer <Values>A4,1; |
| 13 | 1st TRAY PAPER TYPE | TRAY SETTING | PAPER TYPE OF FIRST TRAY IS SET. PLAIN, THICK, THIN, OHP ARE SETTABLE. | PLAIN, THICK, THIN, OHP | SETTING | SNMPSet-List | <Method> Get(), View(), Send(); <Oid> 1.3.6.2.1.43.xx.xx.x <Type>Integer <Values>PLAIN,1; THICK,2; THIN, 3, OHP,4; |
| 14 | 2nd TRAY PAPER SIZE | TRAY SETTING | PAPER SIZE OF SECOND TRAY IS SET. A4,B5,Letter ARE SETTABLE. AVAILABLE ONLY WHEN OPTIONAL TRAY IS SET. | A4,B5,Letter | SETTING | SNMPSet-List | <Method> Get(), View(), Send(); <Oid> 1.3.6.2.1.43.xx.xx.x <Type>Integer <Values>A4,1;A5,4;A6,5;Letter,6; |
| 15 | 2nd TRAY PAPER TYPE | TRAY SETTING | PAPER TYPE OF SECOND TRAY IS SET. PLAIN, THICK, THIN ARE SETTABLE. | PLAIN, THICK | SETTING | SNMPSet-List | <Method> Get(), View(),Send() <Oid> 1.3.6.2.1.43.xx.xx.x <Type>Integer <Values>PLAIN,1; THICK,2; |
| 17 | MULTIPLE TRANSMISSION | CONTROL | MORE THAN ONE SETTING SCREEN IS OPENED. TRANSMISSION OF CURRENT PRINTER SETTING TO MORE THAN ONE PRINTER IS POSSIBLE. | | PROCESSING | Dll | <DLL> Multi Send.dll <Method> Send To Same Type Printers() <Method Param> String: all |
| 18 | SETTING SAVING | FILE | SAVE IF CURRENT PRINTER SETTINGS IS POSSIBLE | | PROCESSING | Save | <Title> SAVE OF PRINTER SETTING |
| 19 | SETTING TO DEFAULT | FILE | CURRENT ALL PRINTER SETTINGS ARE SET TO DEFAULT. | | PROCESSING | SNMPSet-ViewConfirm | <Setting IDs>12;13;14;15...... <Method> SetDefault(), ViewSettings(), Send() |

| ID | ITEM NAME | CATEGORY | COMMENTS | TYPE | SETTING AND PROCESSING DETAILED TYPE | PARAMETER |
|---|---|---|---|---|---|---|
| 211 | REPRESENTATION OF GRID | VIEW | DISPLAY GRID ON SLIDE EDIT SCREEN | PROCESSING | Message-Do | \<Message\> GRID IS DISPLAYED. \<Method\> ViewGrid() |
| 222 | NON-REPRESENTATION OF GRID | VIEW | IF GRID IS DISPLAYED ON SLIDE EDIT SCREEN, GRID SETTING IS CHANGED TO NON-REPRESENTATION | PROCESSING | Message-Do | \<Message\> GRID SETTING IS CHANGED TO NON-REPRESENTATION. \<Method\> DeleteGrid() |
| 233 | SLIDE SHOW | VIEW | SLIDE SHOW IS STARTED. | PROCESSING | Message-Do | \<Message\> SLIDE SHOW IS STARTED. \<Method\> ViewSlideShow() |
| 244 | INSERT OF OUTLINE | EDIT | OUTLINE (INDEX) GENERATED BASED ON SLIDE IS INSERTED INTO CURRENT SLIDE. | PROCESSING | Message-Do | \<Message\> OUTLINE IS INSERTED. \<Method\> InsertOutline() |

FIG.11

DEVICE AND PROGRAM FOR EXECUTING SETTING PROCESS

CROSS-REFERENCE TO RELATED APPLICATION

This application claims priority under 35 U.S.C. §119 from Japanese Patent Application No. 2006-080138, filed on Mar. 23, 2006. The entire subject matter of the application is incorporated herein by reference.

BACKGROUND

1. Technical Field

Aspects of the present invention relate to a device having a function of executing a setting operation using a keyword inputted by a user.

2. Related Art

In general, in order to print out documents generated on a device (e.g., a personal computer), a user operates the device to input printing parameters and to transmit a print instruction containing the printing parameters to a printing device (e.g., a multifunction product). If the user don't know how to set print parameters for printing out documents in a 2-in-1 page layout (where two pages of the document is printed in a sheet), the user opens a help screen and inputs a keyword to a keyword input field of the help screen to search for information on proper printing parameters for the 2-in-1 page layout.

From items displayed on the help screen as a search result, the user is able to select an item relating to the 2-in-1 page layout. When the user selects the item, a box representing instructions for setting of the printing parameter for the 2-in-1 page layout is displayed. By inputting the parameters in accordance with the displayed instructions, the user is able to achieve the printing in the 2-in-1 page layout.

However, names of items to be used as keywords may vary depending on device types. Therefore, there is a possibility that the user is unable to obtain a desirable search result even if the user inputted a keyword, which the user think appropriate, to the help screen.

Japanese Patent Provisional Publication No. 2004-145774 (hereafter, referred to as JP 2004-145774A) discloses a device (MFP; Multifunction Product) configured to have a table storing first information representing setting items which a setting screen for printing supports and second information representing words synonymous with the setting items in the first information. In the device disclosed in JP 2004-145774A, when the user inputs a keyword "2-in-1" to a keyword input screen, an item matching the keyword "2-in-1" is searched for from the second information, and "Layout" which is first information relating to the second information "2-in-1" is selected. Then, an item for displaying a setting screen for the "layout" is displayed together with other items for displaying other setting screens. By selecting the item "layout" from the displayed items, onscreen representation jumps to the setting screen including a setting item for the "layout". On this setting screen for the "layout", the user is allowed to set the setting parameter to the 2-in-1 page layout.

However, in the device disclosed in JP 2004-145774A, the keyword input screen is configured to only have links to setting screens (e.g., the setting screen for the "layout") which have been stored in advance in the device so that the onscreen representation can jump to a setting screen including a setting item corresponding to the inputted keyword. It should be noted that each setting screen includes a plurality of setting items corresponding to various types of keywords. Therefore, after the setting screen including the setting item corresponding to the keyword is displayed in response to the input of the keyword, the user needs to find out the setting item, which the user wants to set (i.e., corresponds to the inputted keyword), from the displayed setting screen. Such a user operation is inconvenient to the user.

SUMMARY

Aspects of the present invention are advantageous in that a device having excellent usability of conducting a setting operation can be provided.

BRIEF DESCRIPTION OF THE ACCOMPANYING DRAWINGS

FIG. 3 illustrates an example of data stored in a setting and processing database.

FIG. 11 illustrates another example of data stored in the setting and processing database.

DETAILED DESCRIPTION

General Overview

Figure 1:
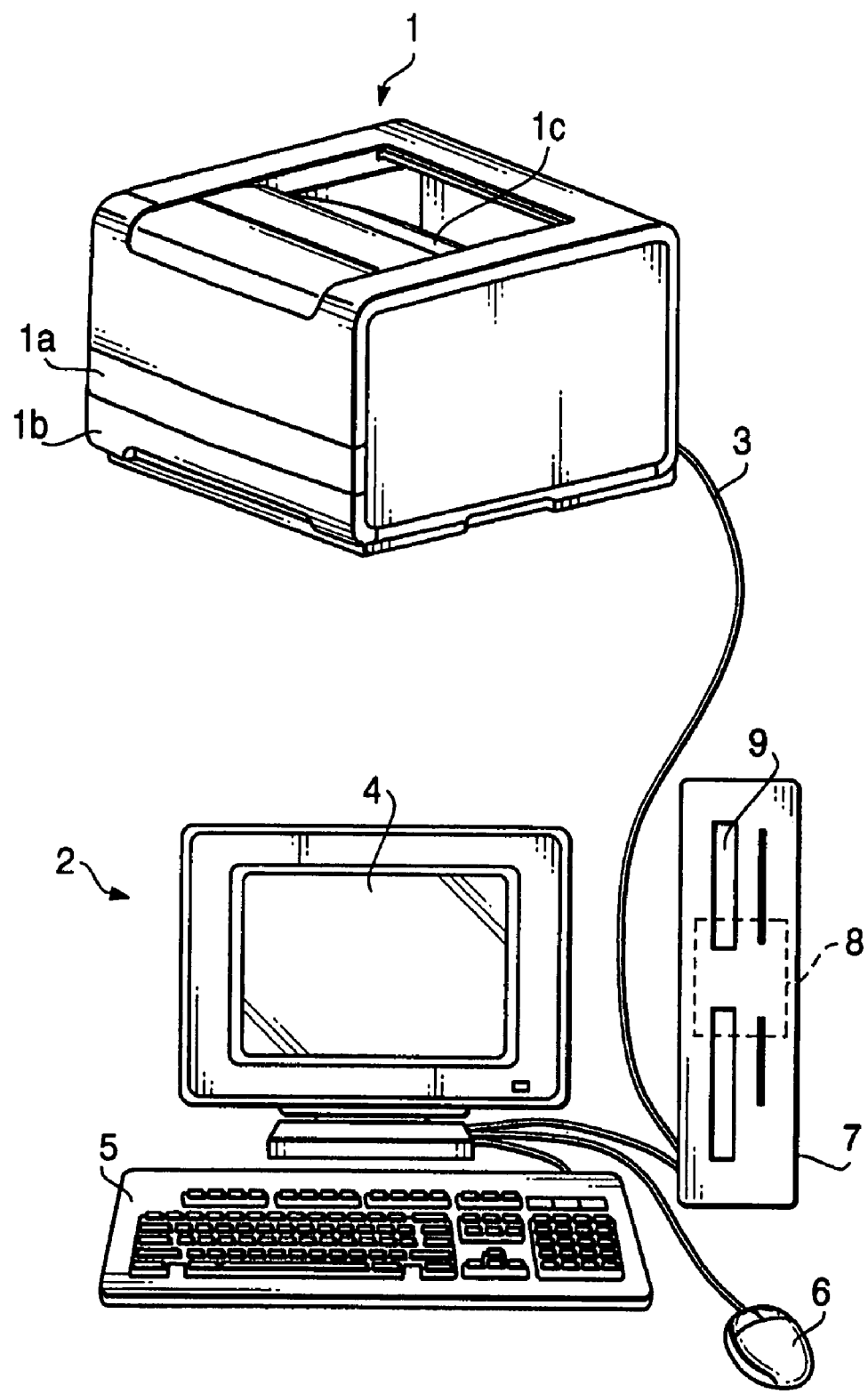
FIG. 1 illustrates a configuration of a printing system according to an embodiment of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a device, which comprises a storage unit configured to store a plurality of items relating to setting of a predetermined device and parameters associated with the plurality of items, a search unit configured to search the storage unit for at least one item that matches a keyword, and a setting screen generation unit configured to generate a setting screen for the setting of the at least one setting item searched by the search unit, using the parameters associated with the at least one item.

In the above mentioned configuration, the at least one item is searched for based on the keyword (e.g., a keyword inputted by a user), and the setting screen is generated in accordance with the parameters corresponding to the searched item. Therefore it is possible to provide a setting screen especially matching a user's intention. Such a configuration avoids the necessity for a user of finding a desired item from a setting screen. Therefore, usability of a setting operation can be enhanced.

In at least one aspect, the storage unit stores information for relating an item to different items. In this case, the setting screen generation unit is configured such that if the search unit searches for the item related to the different items, the setting screen generation unit generates the setting screen enabling a user to conduct a setting operation for the item and the related different items.

With this configuration, if an item is searched, other items related to the searched item are also selected, and the setting screen is generated to include all the searched and selected items. Therefore, the user is allowed to make settings for more than one related item matching an inputted keyword. Therefore, excellent usability of a setting operation can be achieved.

In at least one aspect, the device further comprises a setting operation execution unit configured to execute an operation corresponding to the at least one item searched by the search unit in accordance with the parameters corresponding to the at least one item searched by the search unit.

Since the device executes the operation corresponding to the searched item, there is no necessity for the user to instruct the device to execute the operation after setting of the item.

In at least one aspect, the storage unit stores an operation type being associated with each of the plurality of items. In this case, The device may further comprises an execution type judgment unit configured to make a judgment regarding the operation type corresponding to the at least one setting item searched by the search unit, and a control unit configured to control the setting screen generation unit to generate the setting screen if the execution type judgment unit judges that the operation type corresponding to the at least one setting item searched by the search unit indicates that the setting screen should be generated, and to control the setting operation execution unit to execute the operation without causing the setting screen generation unit to generate the setting screen if the execution type judgment unit judges that the operation type corresponding to the at least one setting item searched by the search unit indicates that the operation should be executed.

In the above mentioned configuration, if the execution type judgment unit judges that the operation type corresponding to the at least one setting item searched by the search unit indicates that the setting screen should be generated, the control unit causes the setting screen generation unit to generate the setting screen to allow the user to make settings for the item. If the execution type judgment unit judges that the operation type corresponding to the at least one setting item searched by the search unit indicates that the operation should be executed, the control unit controls the setting operation execution unit to execute the operation without requesting the user to make settings for the item through the setting screen. Since the setting screen is not generated if there is no necessity to generate the setting screen, it is possible to selectively and effectively execute a necessary operation for each of the items.

In at least one aspect, the storage unit stores names of the plurality of items and comments concerning the plurality of items while respectively associating the names to the plurality of items and respectively associating the comments to the plurality of items. In this case, the search unit specifies a name or comments containing a word related to the keyword from the names and comments in the storage unit, and searches for the at least one item corresponding to the specified name or comments. Further, the search unit is configured such that if the at least one item searched by the search unit includes two or more items, the search unit assigns a higher priority to a first item of the two or more items searched by the name corresponding to the keyword relative to a second item of the two or more items searched by the comments corresponding to the keyword.

According to the above mentioned configuration, the search unit assigns a higher priority to a first item of the two or more items searched by the name corresponding to the keyword relative to a second item of the two or more items searched by the comments corresponding to the keyword. The reason is that a user frequently input a keyword with a name of a desired item in mind the name more deeply relates to the user's intention relative to the comments. Therefore, the device is capable of enabling the user to generate a setting screen for making settings for the item by simply inputting at least a part of comments of a process to be executed even if the user does not know the name of the setting item. In addition, the item having the higher priority is displayed preferentially if more than one item related to the keyword is searched for. Therefore, the user is able to find out the desired item from the displayed search result.

In at least one aspect, the device further comprises a list generation unit configured to generate and display a list of the at least one item searched by the search unit and to allow a user to select a target item of the at least one item from the list.

In at least one aspect, the setting screen generation unit generates the setting screen for the target item selected by the user.

In at least one aspect, the device further comprises an index generation unit configured to consult the storage unit to generate an index database in which each of a plurality of keywords extracted form the storage unit is associated with one or more items of the plurality of items.

In at least one aspect, the index generation unit calculates relationship between each keyword and the associated one or more items in accordance with a predetermined criterion and stores the calculated relationship in the index database.

In at least one aspect, the search unit consults the index database to search for the at least one item matching a designated keyword.

In at least one aspect, the setting screen generation unit generates the setting screen corresponding to one of the at least one item having highest relationship with the designated keyword.

In at least one aspect, the device further comprises an item type judgment unit configured to make a judgment regarding a type of the at least one item searched by the search unit; and a control unit configured to control the setting screen generation unit to generate the setting screen if the item type judgment unit judges that the type of the at least one item corresponds to a setting item, and to execute a process corresponding to the at least one item if the item type judgment unit judges that the type of the at least one item corresponds to a processing item.

In at least one aspect, the keyword is inputted by a user operation.

According to another aspect of the invention, there is provided a device, which comprises a storage unit configured to store a plurality of items relating to setting of a predetermined device and parameters associated with the plurality of items, a search unit configured to search the storage unit for at least one item that matches a keyword, and a process execution unit configured to execute a process corresponding to the at least one item searched by the search unit in accordance with the parameters corresponding to the at least one item.

According to the device configured as above, the at least item is searched for based on the keyword (e.g., a keyword inputted by a user), and the process corresponding to the at least one item searched by the search unit is executed based on the parameters corresponding to the searched item. Such a configuration avoids the necessity for a user of finding a desired processing item from a search result. Therefore, usability of a setting operation can be enhanced.

In at least one aspect, the plurality of items stored in the storage unit includes a plurality of processing items, the search unit searches for at least one processing item matching the keyword, and the processing unit executes the process corresponding to the at least one process item searched by the search unit.

According to another aspect of the invention, there is provided a computer readable medium having computer readable instructions stored thereon, which, when executed by a computer, are configured to store a plurality of items relating to setting of a predetermined device and parameters associated with the plurality of items in a storage unit, to search the parameters stored in the storage unit for at least one item of the plurality of items matching a keyword, and to generate a setting screen using the parameters corresponding to the searched at least one item.

Such a configuration makes it possible to provide a setting screen especially matching a user's intention, and avoids the necessity for a user of finding a desired item from a setting screen. Therefore, usability of a setting operation can be enhanced.

In at least one aspect, the instructions further cause the computer to execute an operation corresponding to the searched at least one item in accordance with the parameters corresponding to the searched at least one item.

In at least one aspect, the instructions further cause the computer to store operation types in the storage unit while respectively associating the operation types with the plurality of items, to make a judgment regarding an operation type of the operation types corresponding to the searched at least one item, to generate the setting screen if it is judged that the operation type corresponding to the searched at least one setting item indicates that the setting screen should be generated, and to execute the operation if it is judged that the operation type corresponding to the searched at least one setting item indicates that the operation should be executed.

According to another aspect of the invention, there is provided a computer readable medium having computer readable instructions stored thereon, which, when executed by a computer, are configured to store a plurality of items relating to setting of a predetermined device and parameters associated with the plurality of items in a storage unit, to search the parameters stored in the storage unit for at least one item of the plurality of items matching a keyword, and to execute a process corresponding to the searched at least one item in accordance with the parameters corresponding to the at least one item.

Such a configuration avoids the necessity for a user of finding a desired processing item from a search result. Therefore, usability of a setting operation can be enhanced.

EMBODIMENT

Hereafter, an embodiment according to the invention will be described with reference to the accompanying drawings.

FIG. 1 illustrates a configuration of a printing system according to an embodiment of the invention. As shown in FIG. 1, the printing system includes a printer 1 and a PC (Personal Computer) 2 which is connected to the printer 1 via a cable 3. The printer 1 includes a first tray 1a, a second tray 1b, and a sheet ejection tray 1c which is provided on an upper surface of the printer 1. When receiving a print command from the PC 2, the printer 1 operates to pick up a sheet from one of the first tray 1a and the second tray 1b, to print an image corresponding to print data on a sheet, and to eject the sheet on which the image is printed to the sheet ejection tray 1c, in accordance with print parameters contained in the print command.

The PC 2 includes a main body 7, a display 4, a keyboard 5, and a mouse 6. The display 4, keyboard 5 and mouse 6 are connected to the main body 7. The main body 7 includes a processing unit 8 which is capable of executing setting operations and processes relating to setting items, and processes relating to processing items which are described later, and a reading unit 9 which reads data and programs from a recording medium such as a CD-ROM.

Figure 2:
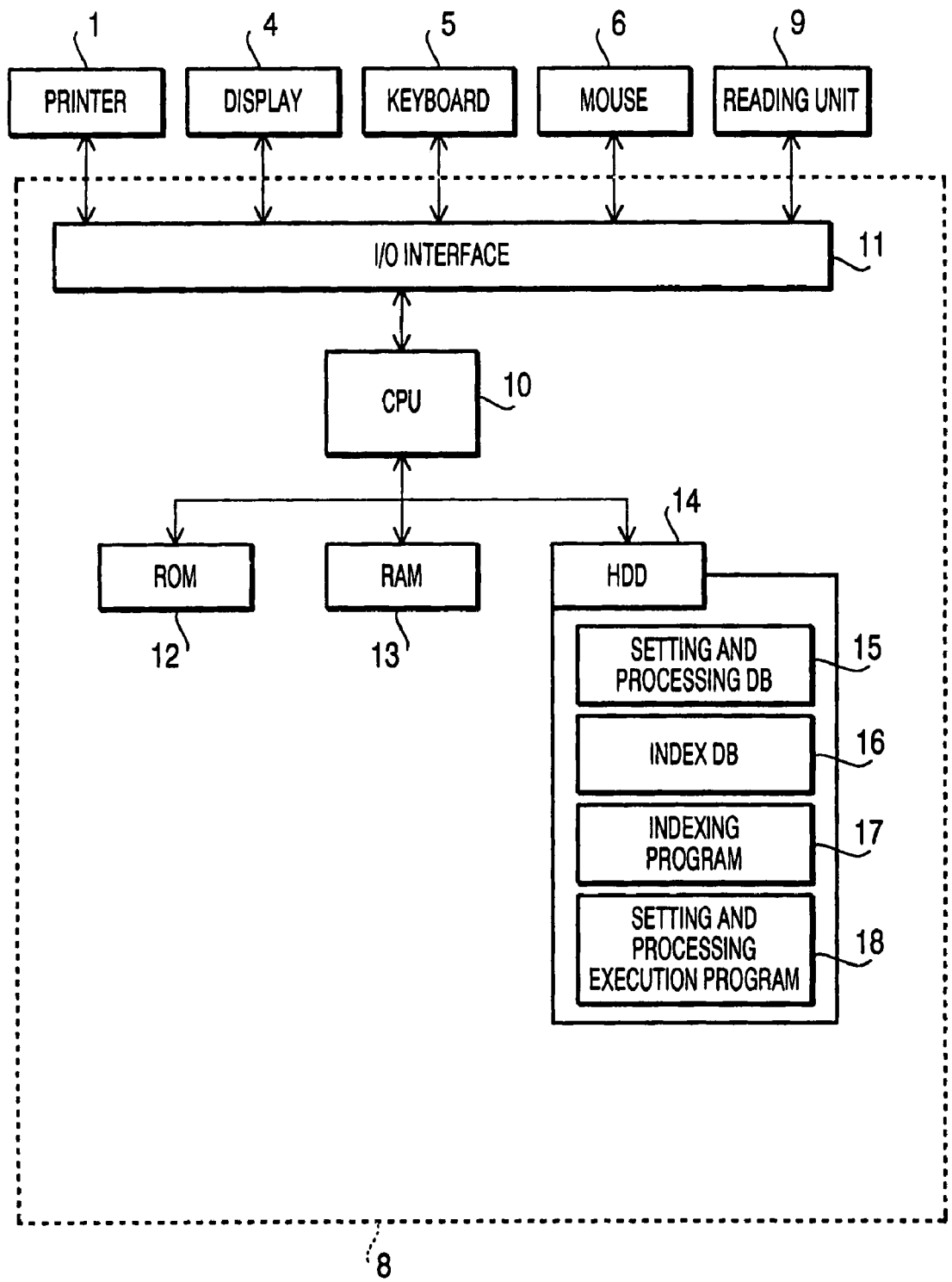
FIG. 2 is a block diagram illustrating a control system of a processing unit in a PC provided in the printing system shown in FIG. 1.

FIG. 2 is a block diagram illustrating a control system of the processing unit 8. In the processing unit 8, an I/O (input and output) interface 11, a ROM 12, a RAM 13, and an HDD (Hard Disk Drive) 14 are connected to a CPU 10. To the I/O interface 11, the display 4, the keyboard 5, the mouse 6 and the reading unit 9 as well as the printer 1 are connected. The HDD 14 stores a setting and processing DB (database) 15, an index DB (database) 16, an indexing program 17 and a setting and processing execution program 18. The indexing program 17 and the setting and processing execution program 18 may be stored in a CD-ROM, and may be stored in the HDD 14 by reading them from the CD-ROM through the reading unit 9.

FIGS. 3 and 11 illustrate examples of data stored in the setting and processing DB 15. As shown in FIG. 3, the setting and processing DB 15 stores setting parameters relating to two types of items: a setting item and a processing item. That is, the setting and processing DB 15 contains setting parameters necessary for the setting related to the setting items and setting parameters necessary for the setting related to the processing items.

The setting parameters include information (e.g. an "ID") for generating an application, information (e.g., "item name", "category", "comments" and "range") necessary for generating a screen, and information (e.g., "type", "setting and processing detailed type" and "parameter") necessary for processing. The "ID" is provided for each of setting items and processing items to identify a setting item or a processing item. The "item name" is used as a title of a screen (e.g., a search result representation screen or a setting screen). The item name corresponds to a name of a setting item. The "category" relates to classification of information used, for example, in a tree-type interface for settings. The "comments" are comments on a setting item or a processing item, and is displayed on the search result representation screen.

The "range" represents a range of settable values of a setting item. The "type" is used to distinguish between a setting item and a processing item. In this embodiment, the type of the setting item is represented as "setting" and the type of the processing item is represented as "processing". As can be seen from FIGS. 3 and 11, each setting item has the "range", but each processing item does not have the "range". The reason is that the setting item requires a user operation for selecting a setting value from more than one setting value, while the processing item does not require such a user operation.

The "setting and processing detailed type" represents detailed information on the setting type and the processing type (i.e., setting detailed type and processing detailed type). More specifically, the setting detailed type "SNMPSet-SettingList" means an operation for displaying a setting screen including more than one setting and for transmitting a targeted setting to the printer 1 in accordance with an SNMP (Simple Network Management Protocol) when the setting screen is closed by pressing of an "OK" button. The "SNMPSet-List" shown in FIG. 3 means an operation for displaying a setting list box containing values of the "range" set in the "parameter", and for transmitting a targeted setting to the printer 1 in accordance with the SNMP when the setting list box is closed by pressing of an "OK" key.

The processing detailed type "Save" shown in FIG. 3 means an operation for opening a dialog box for saving. The processing detailed type "Message-Do" shown in FIG. 11 means an operation for executing a process after representation of a predetermined confirmation message. The "parameter" represents parameters used for execution of an operation designated by the "setting and processing detailed type".

The index DB 16 stores index data obtained by execution of the indexing program 17. The index data stores a list of keywords extracted from the setting and processing DB 15 so as to easily search for a setting item or a processing item stored in the setting and processing DB 15 when a keyword search is executed.

Figure 4:
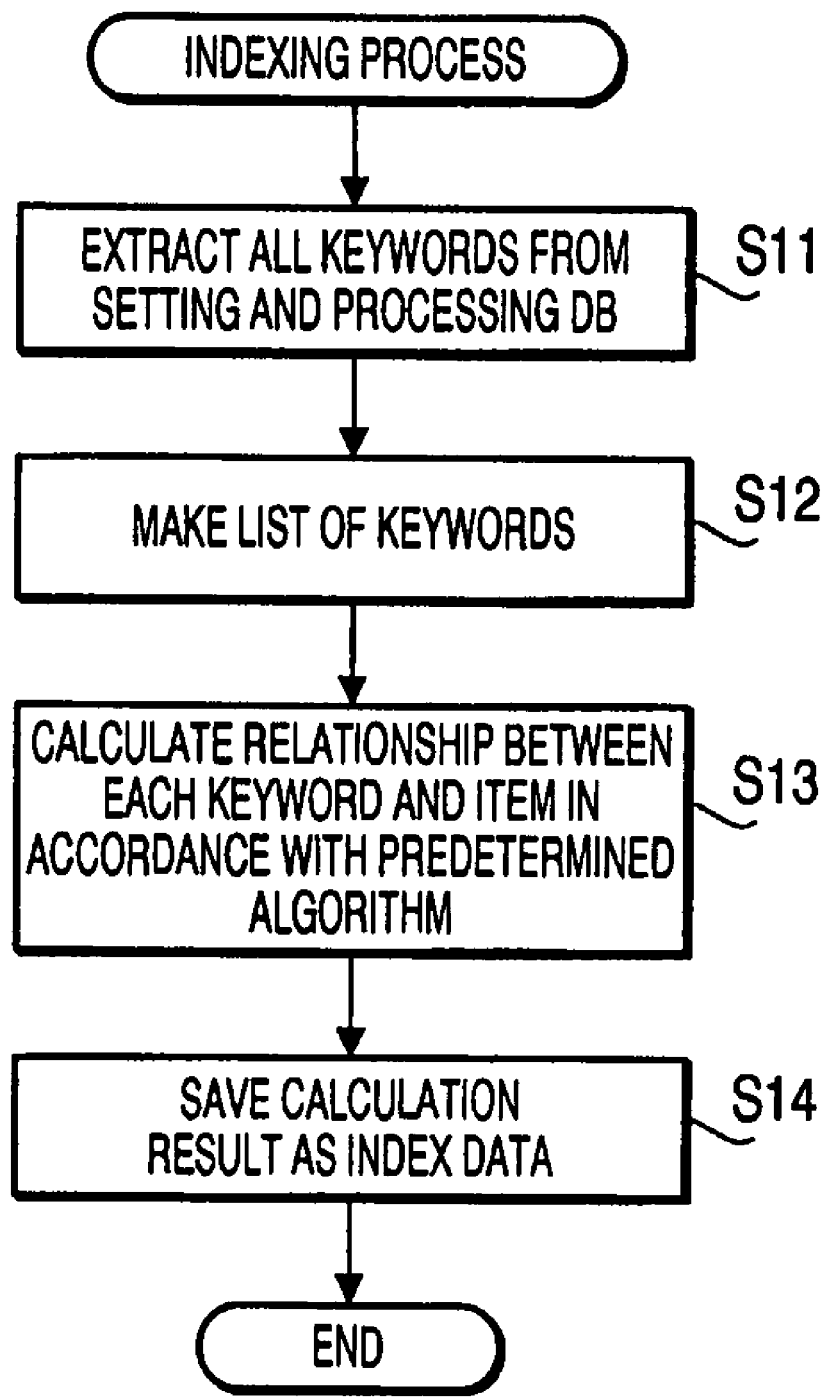
FIG. 4 is a flowchart illustrating an indexing process executed by the processing unit.

FIG. 4 is a flowchart illustrating an indexing process executed under control of the CPU 10 of the PC 2 when the CPU 10 executes the indexing program 17. The indexing process is executed each time a setting item or a processing item is added to the setting and processing DB 15, modified, or deleted from the setting and processing DB 15. First, the CPU 10 extracts all the keywords from the entire region of the setting and processing DB 15 (step S11), and makes a list of the extracted keywords (step S12). By extracting all the keywords from the entire region of the setting and processing DB 15, it is possible to provide setting items and processing items relating to each keyword for a user without omission. Such a configuration makes it possible to easily search for a setting item or a processing item intended by a user.

In step S13, the CPU 10 calculates relationship between a keyword and each setting item and relationship between a keyword and each processing item. With this configuration, it is possible to identify a setting item having high relationship with a keyword and to preferentially provide the identified setting item for the user even when a plurality of setting items and processing items are associated with the keyword.

The relationship is calculated, for example, by weighting keywords or assigning order of priority to keywords in accordance with the types of keywords. For example, if keywords are weighted by assigning weighting values "3:3:1:2" to "item name", "category", "comments" and "range", respectively, the sum of the weighting values corresponding to a keyword is calculated for each of setting items and processing items. In another example where "item name" is assigned higher priority than that of "comments", the relationship between a keyword and a setting item (or a processing item) is calculated in accordance with the order of priority. Next, in step S14, the result of the calculation in step S13 is stored in the index DB 16 as the index data.

Figure 5:
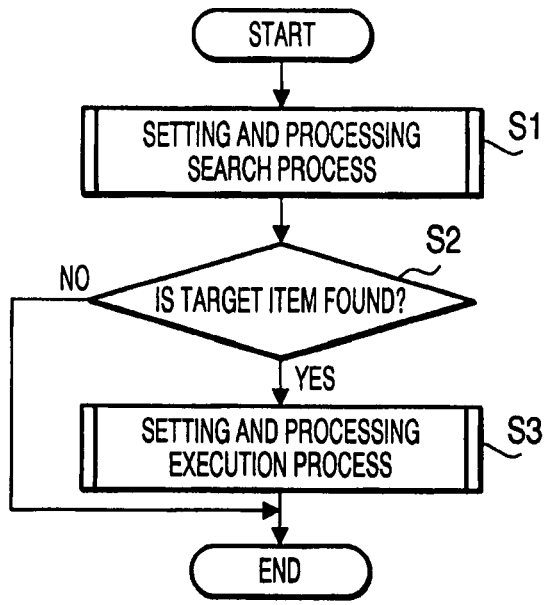
FIG. 5 is a flowchart illustrating a process executed when the processing unit executes a setting and processing execution program.

FIG. 5 is a flowchart illustrating a process executed when the CPU 10 of the processing unit 8 executes the setting and processing execution program 18. The processing unit 8 executes the process shown in FIG. 5 when a keyword is inputted to the processing unit 8, for example, through an application screen containing a keyword input field shown in FIG. 9. First, in step S1, the CPU 10 executes a setting and processing search process in accordance with the keyword inputted by the user. Then, the CPU 10 judges whether a target item exists (step S2). For example, if the user does not select one of the setting items and processing items displayed on the display 4 as a list of items (see FIG. 9), it is suspected that a setting item or a processing item desired by the user does not exist in the current list and therefore the user will input another keyword. Therefore, in such a case, the CPU 10 judges that there is not a target item (S2: NO).

If the user selects one of the setting items and processing items displayed on the display 4, the CPU 10 judges that there is a target item (S2: YES) and control proceeds to step S3. In step S3, a setting and processing execution process is executed.

Figure 6:
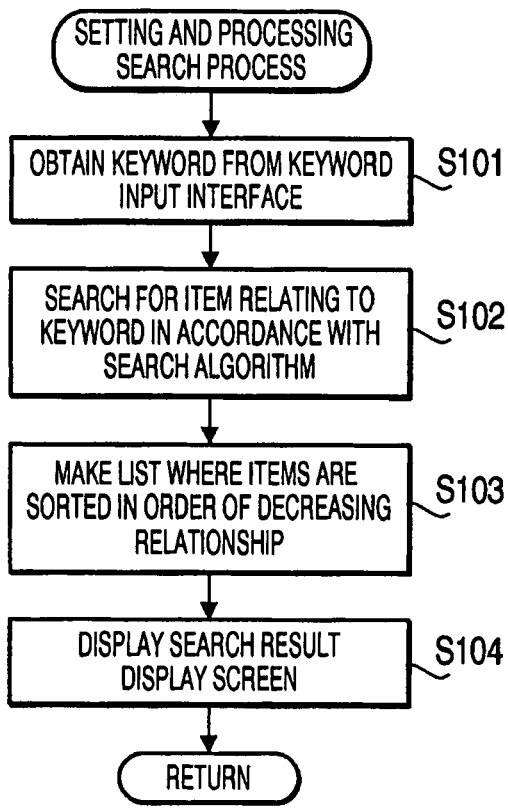
FIG. 6 is a flowchart illustrating a setting and processing search process executed by the processing unit as a subroutine of the process shown in FIG. 5.

The setting and processing search process executed in step S1 will now be described with reference to FIG. 6. If the user inputs a keyword "paper" to a keyword input field (a keyword input interface) 21 of the application screen shown in FIG. 9 using the keyboard 5, and clicks a search button 22 using the mouse 6, the CPU 10 notices that the user inputted the keyword, and initiates the setting and processing execution program 18. First, in step S101, the CPU 10 obtains the keyword "paper" inputted through the application screen and stores the keyword in the RAM 13.

Next, in step S12, the CPU 10 searches for setting items and processing items matching the keyword "paper" obtained in step S101 in accordance with a predetermined search algorithm. That is, the CPU 10 searches the index DB 16 for setting items and processing items including the keyword "paper" by extracting setting parameters and processing parameters of the index DB 16. In this case, the setting items "tray setting", "first tray paper size", "first tray paper type", "second tray paper size", "second tray paper type" are searched for.

Next, in step S103, the CPU 10 analyzes the relationship between the keyword and each searched setting item by consulting the index data stored in the index DB 16, and generates a list in which the search items are sorted in order of decreasing relationship with the keyword. For example, if the "item name" has high priority than that of "comments", a setting item of which "item name" contains the keyword "paper" is arranged in the list such that the user is able to recognize that the setting item of which "item name" contains the keyword "paper" is assigned higher priority than that of a setting item of which "comments" contains the keyword "paper". The list may be generated such that each setting item has information representing details of the setting item as well as the item name. For example, a display filed of "item name", a display field of "type", a display field of "comments", a display field of "range" may be generated for each setting item in the list. In these display fields, details of the "item name", "type", "comments" and "range" are obtained from the setting and processing DB 15 shown in FIG. 3.

Figure 9:
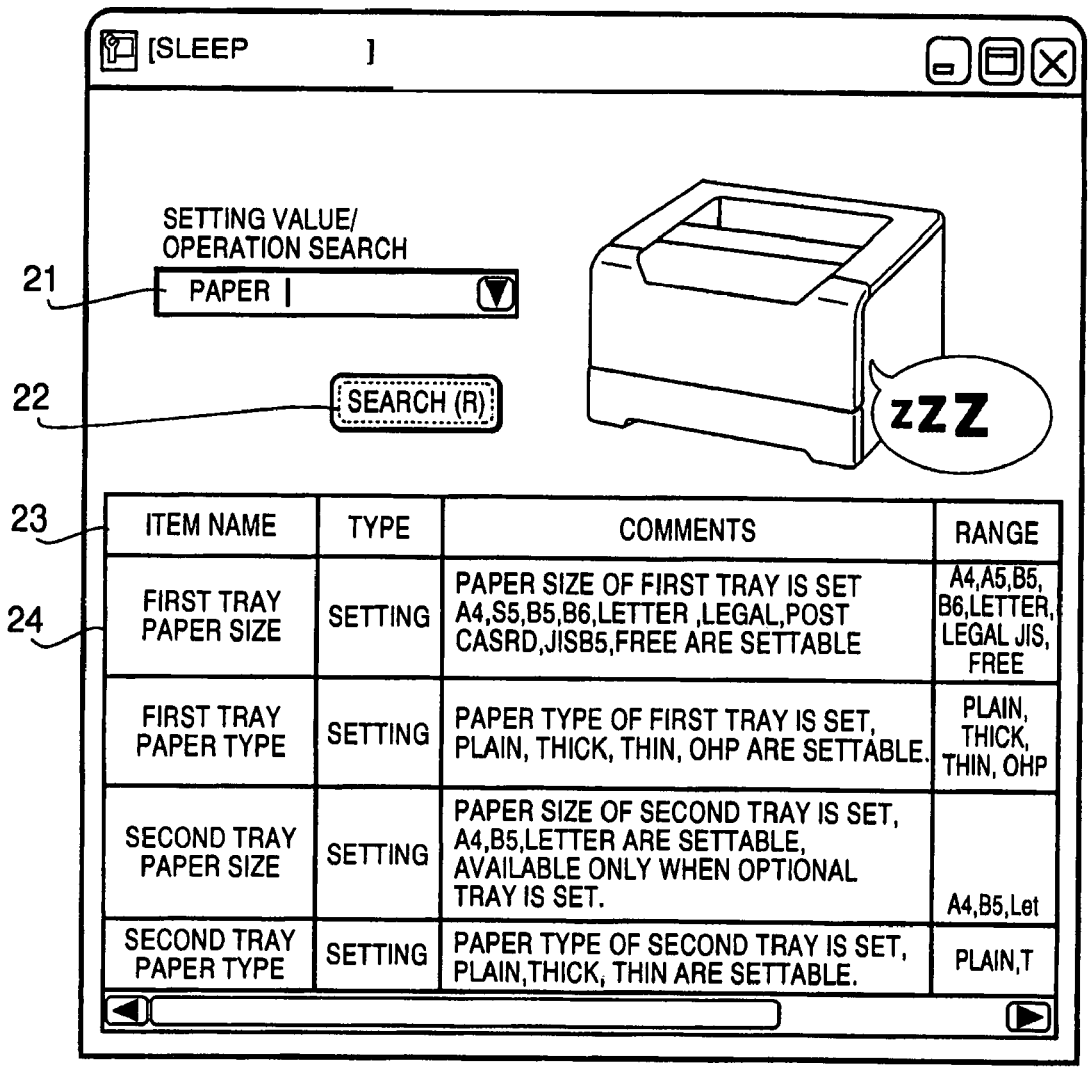
FIG. 9 illustrates an example of an application screen containing a keyword search input field.

After thus generating the list, the list is displayed in a search result display screen 23 as shown in FIG. 9 (step S104). In the search result display screen 23, the "setting name", "type", "comments" and "range" are displayed for each of the setting items.

Checking values of the type, comments and etc. of the setting item in the list, the user is able to recognize details of the setting item and the range within which a setting value can be designated. Therefore, even a user not familiar with setting for a printer is able to select a desired setting item from the search result display screen 23. In the search result display screen 23, the setting items are sorted in order of decreasing relationship with the keyword. Therefore, it is possible to locate the item having higher relationship with the keyword at a noticeable position on the display 4. Such a configuration enables the user to easily find out a desired setting item on the search result display screen 23.

Although the explanation of the setting and processing search process described above focuses on a setting item as a target item to be selected by the user, a processing item may be selected by a user as a target item in the setting and processing search process.

The setting and processing execution process will now be described with reference to FIG. 7. In the setting and processing execution process, a setting operation for a setting item or a process for a processing item is executed in accordance with a user's instruction.

To explain the setting and processing execution process, first, a situation where a user sets the paper size of the first tray 1a to a free size is chosen by way of an example. If a user double-clicks the item name "first tray paper size" 24 in the search result display screen 23 using the mouse 6, the CPU 10 judges that the setting item "first tray paper size" is designated by the user through the search result display screen 23. In this case, the CPU 10 obtains the "type" of the setting item "first tray paper size" from the setting and processing DB 15 (step S301).

Next, in step S302, the CPU 10 judges whether the "type" obtained in step S301 is "setting". Since the "type" 41 of the setting item "first tray paper size" 24 is "setting" (see FIG. 3) (S302: YES), control proceeds to step S303. In step S303, the CPU 10 obtains the setting detailed type stored in the "setting and processing detailed type" 42 of the setting item "first tray paper size" 24. Then, the CPU 10 obtains parameters stored in the "parameter" 43 of the setting item "first tray paper size" shown in FIG. 3 (step S304). With the above mentioned operations, data necessary for executing a process for the setting item can be obtained.

Next, in step S305, the CPU 10 judges whether representation of a setting screen is necessary by checking the details of the "setting detailed type" obtained in step S303. If representation of the setting screen is not necessary (S305: NO), control proceeds to step S309. Since the "setting item" obtained in step S303 is "SNMPSet-List", it is required to display a setting list box having the "range" defined by the "parameter". That is, in this case, the CPU 10 judges that representation of the setting screen is necessary (S305: YES), and control proceeds to step S306 to execute a setting screen creation process.

Figure 7:
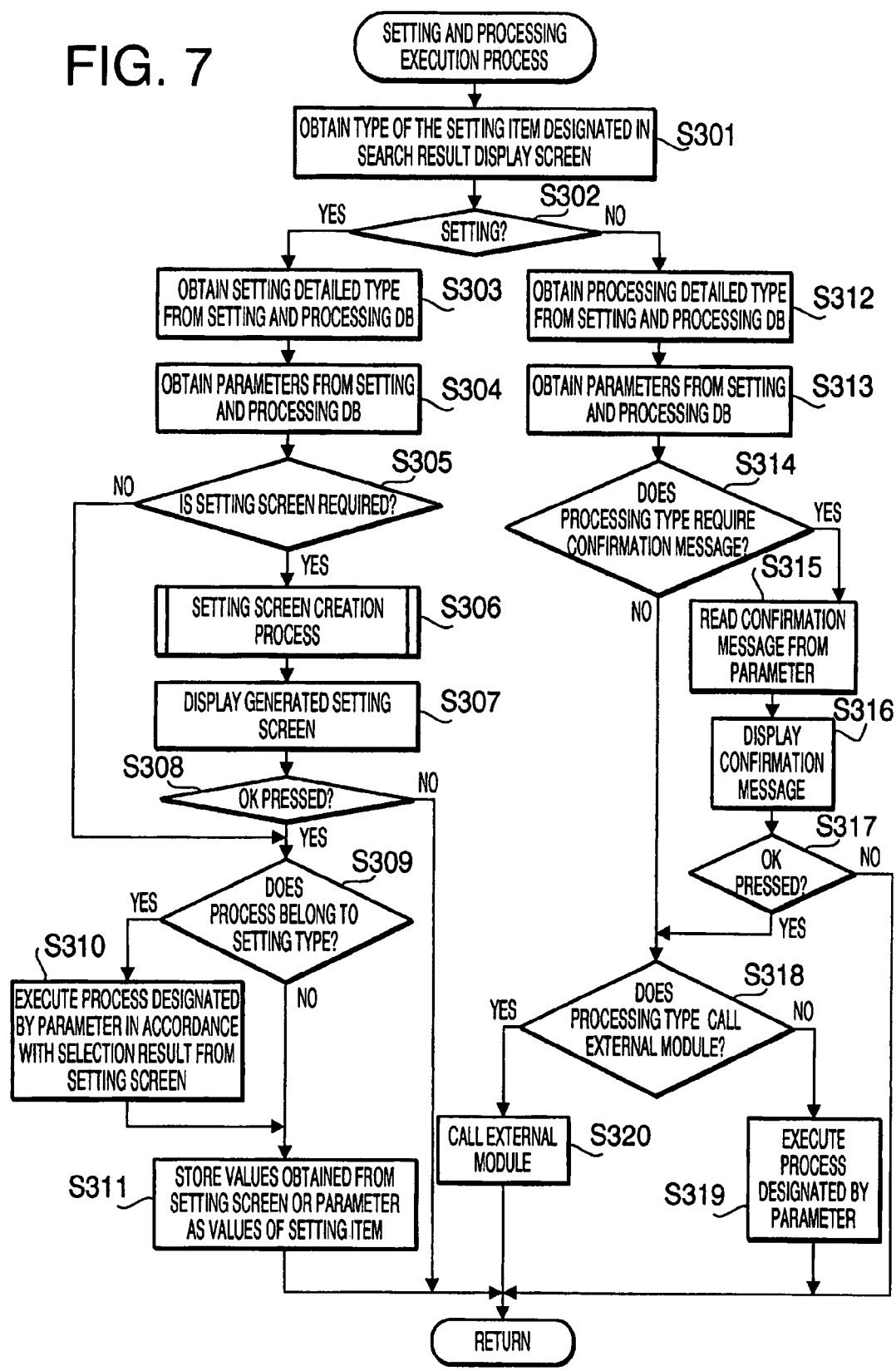
FIG. 7 is a flowchart illustrating a setting and processing execution process executed by the processing unit as a subroutine of the process shown in FIG. 5.
Figure 8:
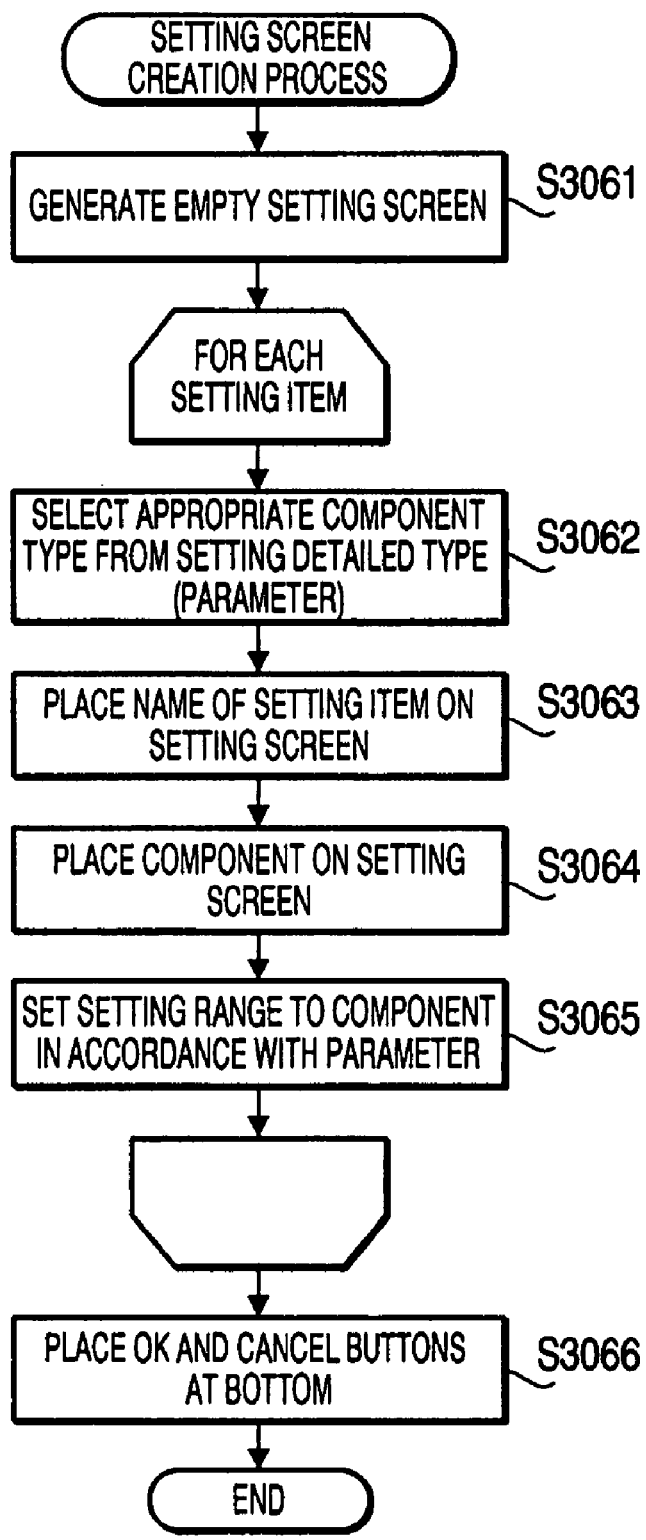
FIG. 8 is a flowchart illustrating a setting screen creation process executed by the processing unit as a subroutine of the process shown in FIG. 7.

FIG. 8 is a flowchart illustrating the setting screen creation process executed in step S306 of FIG. 7. When the setting screen creation process is initiated, the CPU 10 generates an empty setting screen (step S3061). Next, in step S3062, the CPU 10 selects an appropriate component type (e.g., a list box, a combo box, a letter input text box, a numeric value input slide bar, a radio button, and etc.) in accordance with the "parameter" obtained in step S307 of FIG. 7. Since, in the above mentioned situation, the "setting detailed type" of the setting item "first tray paper size" requires the representation of a list box, the CPU 10 selects a list box as a component type. In this case, the CPU 10 calculates a window size of the entire setting screen considering the "range" (A4, 1;A5, 2;A6, 3;B5, 4;A6, 5;Letter, 6;Legal, 7;JISB5, 8; Post Card, 9;Free, 10;), a size of a display area of each item name of the setting item, a size of the margin, and sizes of the OK button and the cancel button.

If it is necessary to display more than one setting item, for example, in the case where the user selected more than one setting item or in the case where one or more additional setting items are to be selected in response to a user selection for a setting item, the window size of the entire setting screen is calculated by summing sizes of display areas for the setting items to be displayed.

In step S3063, the CPU 10 places the item name of the setting item "first tray paper size" with the predetermined margin on the empty setting screen set in S3061. Then, the CPU 10 places the component (i.e., the list box selected in step S3062) with a predetermined margin on the empty setting screen set in step S3061 (step S3064).

Next, in step S3065, the CPU 10 adds the setting range (A4, A5, A6, B5, B6, Letter, Legal, JISB5, Post Card, Free) to the list box in accordance with the "parameter" (<values>A4, 1;A5, 2;A6, 3;B5, 4;A6, 5;Letter, 6;Legal, 7;JISB5, 8;Post Card, 9;Free, 10;) of the setting item "first tray paper size" selected by the user.

After finishing arrangement of the "item name", "component" and "range" for all of the setting items, the CPU 10 places the OK button and cancel button at the button of the setting screen (step S3066). After thus finishing the creation of the setting screen, control proceeds to step S307.

Figure 10:
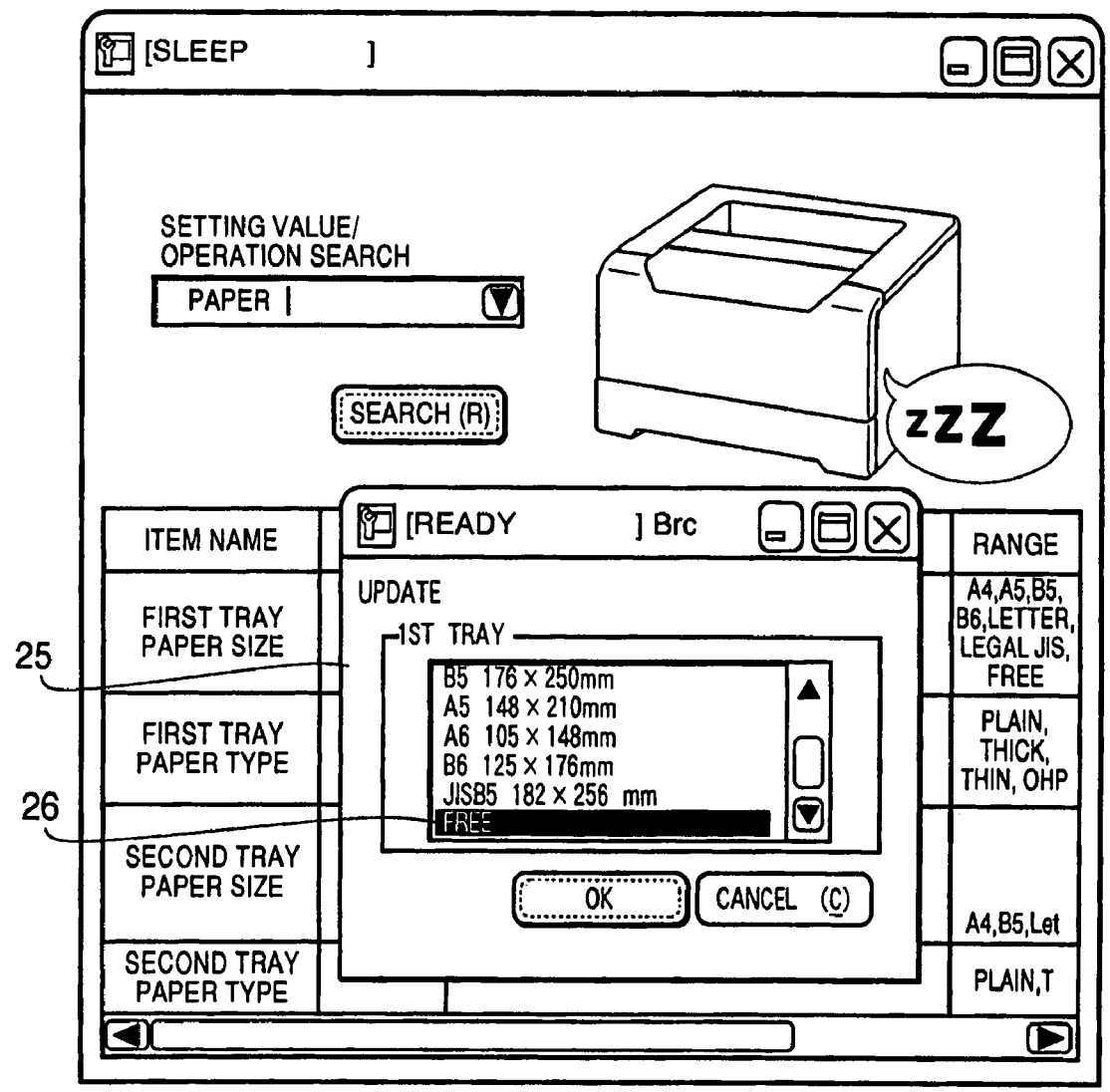
FIG. 10 illustrates an example of a setting screen generated in the setting screen creation process show in FIG. 8.

Referring back to FIG. 7, the CPU 10 displays the setting screen generated in the setting screen creation process shown in FIG. 8, on the display 4 (step S307). FIG. 10 shows an example (a setting screen 25) of the setting screen. Next, in step S308, the CPU 10 judges whether the user who is checking the setting screen 25 clicks the OK button 27 using the mouse 6. If the clicked button is not the OK button 27 but the cancel button 28 (S308: NO), control returns to the process shown in FIG. 5 because in this case it is suspected that the user does not intend to execute the setting operation for the setting item.

If the user clicks the OK button 27 (S308: YES), control proceeds to step S309 where the CPU 10 refers to the "setting detailed type" obtained in step S303 to judge whether a process belongs to the "setting detailed type". If a process does not belong to the "setting detailed type" (S309: NO), control proceeds to step S311.

Regarding the above mentioned situation, the setting detailed type "SNMPSet-List" of the setting item "first tray paper size" selected by the user requires transmission of settings to the printer 1 in accordance with SNMP after closing of the window by the OK button 27. That is, a process belongs to the "setting detailed type" of the setting item "first tray paper size" (S309: YES). In this case, control proceeds to step S310. For example, if the user selects the "Free" 26 on the setting screen 25 shown in FIG. 10 and clicks the OK button 27, the selection result is transmitted to the printer 1 by SNMP in accordance with the information of the parameter "Oid" and "Type" of the setting item "first tray paper size" (see FIG. 3). Consequently, a process for changing the paper size of the tray 1a of the printer 1 to the free size is finished.

In step S311, the CPU 10 stores the setting values designated through the setting screen and the values of the "parameter" shown in FIG. 3 in the processing unit 8 as values of the setting item so as to memorize current settings of the printer 1. Then, control returns to the process shown in FIG. 5.

Hereafter, the setting and processing execution process is explained with regard to a situation where a grid display process is executed as a process for a processing item. For example, if the user inputs a keyword "grid" in the keyword input field 21 of a keyword search screen shown in FIG. 12 and clicks a search button 22, the list 23 which is obtain by searching the index DB 16 for items relating to the keyword "grid" is displayed (see FIG. 12). If the user selects an item "representation of grid" 31 (S2: YES), the CPU 10 obtains the "type" 51 of the processing item "representation of grid" from a table shown in FIG. 11.

Since the "type" obtained in step S301 is not "setting" but "processing" (S302: NO), control proceeds to step S312. In step S312, the CPU 10 obtains the processing detailed type "Message-Do" from the "setting and processing detailed type" 52 of the processing item "representation of grid" shown in FIG. 11. Then, the CPU 10 obtains the parameter "<Message>Grid is Displayed. <Method>ViewGrid( )" stored in the "parameter" 53 of the processing item "representation of grid" shown in FIG. 11 (step S313). Consequently, information necessary for the execution of a process for the processing item is obtained.

In step S314, the CPU 10 checks whether the processing detailed type obtained in step S312 requires a confirmation message. If the confirmation message is not required (S314: NO), control proceeds to step S318.

Figure 13:
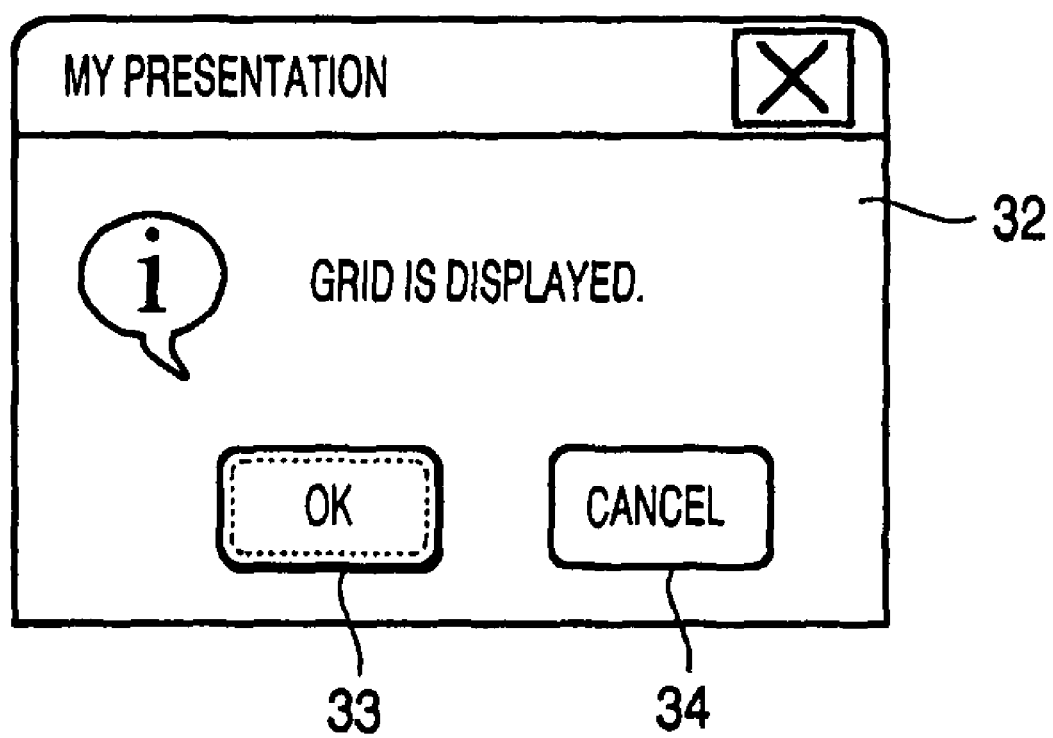
FIG. 13 illustrates a processing operation confirmation screen displayed in the setting and processing execution process shown in FIG. 7.

The processing detailed type obtained in step S312 is "Message-Do". Therefore, representation of the confirmation message is required. In this case, the CPU 10 judges that the representation of the confirmation message is required (S314: YES) and control proceeds to step S315. In step S315, the CPU 10 reads the confirmation message "Grid is displayed." from the parameter obtained in step S313. Next, in step S316, the CPU 10 displays a processing operation confirmation screen 32 representing the obtained confirmation message on the display 4 as shown in FIG. 13.

If the user clicks a cancel button 34 on the processing operation confirmation screen 32 (S317: NO), it is suspected that the user does not want to display the grid. Therefore, in this case, control returns to and terminates the process shown in FIG. 5.

If the user clicks an OK button 33 on the processing operation confirmation screen 32 (S317: YES), control proceeds to step S318. In step S318, the CPU 10 judges whether the processing detailed type obtained in step S312 stores information indicating that an external module (e.g., another setting screen or an external device) should be called. If the processing detailed type stores the information indicating that an external module should be called (S318: YES), control proceeds to step S320 where the CPU 10 calls an external module designated by the parameter obtained in step S313. Then, control returns to and terminates the process shown in FIG. 5.

The processing detailed type of the processing item "representation of grid" is "Message-Do" indicating that a process should be executed after representation of the confirmation message and the process to be executed is the grid display process as stored in the "Method" of the parameter. Therefore, there is no necessity to call an external module (S318: NO). Therefore, in this case, control proceeds to step S319 where the process designated by the parameter obtained in step S313 (i.e., the representation of the grid on the display 4) is executed. Then, control returns to and terminates the process shown in FIG. 5.

Incidentally, it is necessary to add setting items to the setting and processing DB 15, modify or delete setting items of the setting and processing DB 15, for example, when a function is added to the printer 1, or functions of the printer 1 are modified or deleted. As described above, the indexing program 17 generates the relationship between the keyword and each setting item, so that creation of a setting screen or a process for a processing item is appropriately executed in accordance with setting parameter or processing parameter in the setting and processing DB 15 for each of the setting items or processing items. Therefore, even if setting items are added to the setting and processing DB 15, or setting items in the setting and processing DB 15 are modified or deleted, it is not required to manually relate the setting items to other setting items, categories, dialogs, and etc. in the setting and processing DB 15 because it is possible to crate a setting screen or to execute a process for a processing item by simply initiating the indexing program 17 to generate the relationship between the keyword and the setting items. Such a configuration enables the processing unit 8 to smoothly execute system management even if setting items or processing items are added to the setting and processing DB 15, or setting items or processing items in the DB 15 are modified or deleted.

The step S1 of the setting and processing execution process 18 show in FIG. 5 corresponds to a search unit. The setting creation process in step S306 of FIG. 7 corresponds to a setting screen creation unit. The process of step S310 of FIG. 7 corresponds to a setting operation execution unit. The judgment in step S305 of FIG. 7 corresponds to an execution type judgment unit. The process in step S319 of FIG. 7 corresponds to a processing operation execution unit.

If the user inputs the keyword "paper" to the keyword input field 21 of a keyword search screen, the processing unit 8 (i.e., the setting and processing execution program 18) searches the setting and processing DB 15 (which stores the setting parameters necessary for execution of the setting regarding setting items and operations related to the setting items) for setting items containing the keyword "paper" and displays the setting parameters of the searched setting item (e.g., "first tray paper size") (see S3 of FIG. 5, S306 in FIG. 7 and FIG. 8). As a result, the processing unit 8 displays the setting screen 25 representing only the setting item "first tray paper size" searched in accordance with the keyword "paper" (see FIG. 10) and does not displays setting items (e.g., "first tray paper type", "second tray paper size", "second tray paper type") not designated by the user on the setting screen 25.

Therefore, the user is able to make settings of the setting item "first tray paper size" to change the paper size of the first tray without the need for finding the setting item "first tray paper size" on the setting screen 25. Therefore, according to the processing unit 8, usability of a setting operation can be improved.

In the setting and processing DB 15, a setting item is related to other setting items. That is, as shown in FIG. 3, the setting item "tray setting" is related to the setting items "first tray paper size", "first tray paper type", "second tray paper size", "second tray paper type" by storing IDs (identifications) of the related setting items "12", "13", "14" and "15" in the "<Setting IDs>" in the "parameter" 44 of the setting item "tray setting". Since the setting detailed type of the setting item "tray setting" is "SNMPSet-SettingList", it is required to display a setting screen in which more than one setting screen is gathered and to transmit the settings to the printer 1 when the setting screen is closed by the pressing of the OK button. Therefore, when the user selects the setting item "tray setting" from the search result display screen, other setting items "first tray paper size", "first tray paper type", "second tray paper size" and "second tray paper type" related to the "tray setting" are selected automatically and the selected all setting items are displayed in a single screen (see steps S3062 to S3065 of FIG. 8). In this case, if the setting item has the "range", the setting screen is generated so that the user can make settings for the setting item. Therefore, according to the processing unit 8, the user is able to make settings for more than one setting item through a single setting screen. Such a configuration contributes to enhancing usability of a setting operation.

The processing unit 8 transmits a command containing the setting value "Free" set by the user to the printer 1 in accordance with SNMP if the setting detailed type of the searched setting item "first tray paper size" is "SettingsSet-List". As a result, the setting of the tray 1a of the printer 1 is changed to the free size. Therefore, according to the processing unit 8, it is possible to omit an operation for transmitting a command for instructing the printer 1 to change the paper size after the setting of the setting item "first tray paper size" is finished. That is, both the setting and processing can be initiated by a simple one click operation.

The processing unit 8 generates a setting screen by executing the setting screen creation process, for example, if the setting item is "first tray paper size" of which setting type is "setting" which requires representation of a setting screen (i.e., if the case of) (see S305: YES, and S306 of FIG. 7). On the other hand, the processing unit 8 executes the setting operation without requesting the user to make settings through the setting screen, for example, if the setting item is "setting saving" of which setting type is "processing" which requires execution of a setting operation (see S305: NO, and S310 of FIG. 7).

Therefore, according to the processing unit 8, the user does not need to input a command for executing a process of a processing item because the processing unit 8 executes the process without generating a setting screen if there is no necessity to display the setting screen. In addition, in step S316, the confirmation message is displayed and the user is able to check the type of the process to be executed through the confirmation message. Therefore, usability of a setting operation is enhanced.

In the setting and processing DB 15, the "item name" representing a name of a setting item, and "comments" representing comments on a process executed for a setting item are associated with each setting item (see FIG. 3). For example, if the keyword search is executed in accordance with the keyword "paper" inputted by the user, the "item name" or "comments" containing a term related to the keyword "paper" is specified, and the setting item "tray setting", "first tray paper size", "first tray paper type", "second tray paper size" and "second tray paper type" corresponding to the specified "item name" or "comments" are searched for.

If more than one setting item is thus searched for, the setting items "tray setting", "first tray paper size" and "second tray paper size" each of which has the "item name" containing the keyword "paper" are preferentially used relative to the setting items "first tray paper type" and "second tray paper type" each of which has the "comments" containing the keyword "paper". The reason is that the "item name" is assigned higher priority than the "comments", assuming that the user frequently inputs a keyword with a name of a setting item in mind and the "item name" more deeply relates to the user's intention relative to the "comments".

Therefore, the processing unit 8 according to the embodiment is capable of enabling the user to generate a setting screen for making settings for the setting item by simply inputting at least a part of comments of a process to be executed even if the user does not know the name of the setting item.

According to the processing unit 8, the setting item having the higher priority is displayed preferentially in the search result display screen or the setting screen if more than one setting item related to the keyword is searched for. Therefore, the user is able to find out the desired setting item from the search result display screen or the setting screen.

Figure 12:
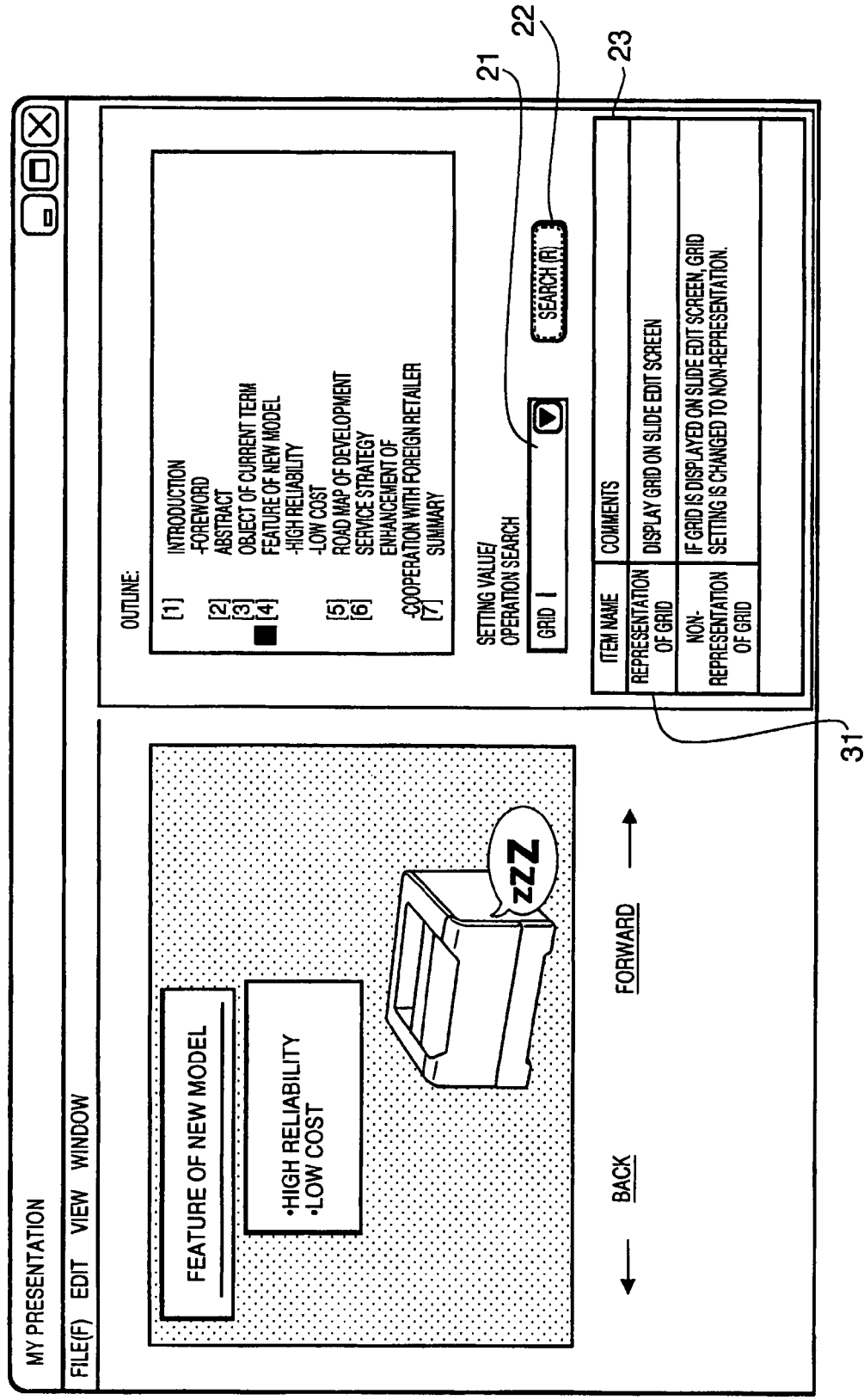
FIG. 12 illustrates another example of an application screen containing a keyword search input field.

According to the processing unit 8 (i.e., the setting and processing execution program 18), if the user inputs a keyword "grid", the setting and processing DB 15 storing the processing parameters necessary for the execution of more than one processing item and processes related to the processing items is searched for the processing items containing the keyword. In this case, the processing items "representation of grid" and "non-representation of grid" are searched for and are displayed in the search result display screen on the display 4 as shown in FIG. 12 (see S1 of FIG. 5 and FIG. 6). When the user selects the setting item "representation of grid" from the search result display screen, the processing unit 8 executes the grid display process without generating the setting screen (see S302: NO, and S312 to S319 in FIG. 7). Therefore, the user is able to execute a desired process without searching for a category to which the processing item relates, displaying a dialog on the display 4, and making settings for the processing item. Therefore, usability of a setting operation is enhanced.

Although the present invention has been described in considerable detail with reference to certain preferred embodiments thereof, other embodiments are possible.

In the above mentioned embodiment, the processing unit 8 (i.e., the PC 2) is connected to the printer 1 in a one-to-one relationship. However, more than one processing unit having the functions according to the embodiment may be connected to the printer 1.

Although the above mentioned embodiment relates to the setting of the printer 1, the above mentioned function of the processing unit can also be applied to not only the setting of image forming devices such as a printer and multifunction product but also the setting of various types of devices.

In the above mentioned embodiment, the setting operation of the processing unit 8 is explained taking the setting of the paper size for the process for the setting item as an example and taking the grid display process for the process of the processing item as an example. However, a process for a setting item may be executed for the setting of the PC 2, and a process for a processing item (e.g., the processing item "setting saving") may be executed for the printer 1.

What is claimed is:

1. A device, comprising:
   a storage unit configured to store a plurality of items and parameters associated with the plurality of items, the plurality of items relating to setting of a target device;
   a search unit configured to search the storage unit, by using a keyword, for at least one item that matches the keyword, the keyword being input by a user;
   a setting screen generation unit configured to generate a setting screen, when the at least one item is found by the search unit, for the setting of the at least one setting item found by the search unit, using parameters corresponding to the at least one item; and
   a setting operation execution unit configured to execute an operation corresponding to the at least one item searched by the search unit in accordance with the parameters corresponding to the at least one item searched by the search unit, wherein:
   the storage unit stores an operation type associated with each of the plurality of items; and
   the device further comprises:
   an execution type judgement unit configured to judge regarding the operation type corresponding to the at least one setting item searched by the search unit; and a control unit configured to control the setting screen generation unit to generate the setting screen when the execution type judgment unit judges that the operation type corresponding to the at least one setting item searched by the search unit indicates that the setting screen should be generated, and to control the setting operation execution unit to execute the operation without causing the setting screen generation unit to generate the setting screen when the execution type judgment unit judges that the operation type corresponding to the at least one setting item searched by the search unit indicates that the operation should be executed.

2. The device according to claim 1, wherein:
the storage unit stores the plurality of items such that a first item is related to a second item different from the first item; and
the setting screen generation unit is configured such that when the search unit searches for the first item, the setting screen generation unit generates the setting screen for the first item and the second item.

3. The device according to claim 1, wherein:
the storage unit further stores names of the plurality of items and comments concerning the plurality of items, the names and the comments being associated with each of the plurality of items, respectively;
the search unit specifies a name or comments containing a word related to the keyword from the names and comments in the storage unit to search for the at least one item corresponding to the specified name or comments; and
the search unit is configured such that when the at least one item searched by the search unit includes two or more items, the search unit assigns a higher priority to a first item of the two or more items searched by the name corresponding to the keyword relative to a second item of the two or more items searched by the comments corresponding to the keyword.

4. The device according to claim 1, further comprising a list generation unit configured to generate and display a list of the at least one item searched by the search unit and to allow a user to select a target item of the at least one item from the list.

5. The device according to claim 4, wherein the setting screen generation unit generates the setting screen for the target item selected by the user.

6. The device according to claim 1, further comprising an index generation unit configured to consult the storage unit to generate an index database in which each of a plurality of keywords extracted form the storage unit is associated with one or more items of the plurality of items.

7. The device according to claim 6, wherein the index generation unit calculates relationship between each keyword and the associated one or more items in accordance with a predetermined criterion and stores the calculated relationship in the index database.

8. The device according to claim 7, wherein the search unit consults the index database to search for the at least one item matching a designated keyword.

9. The device according to claim 8, wherein the setting screen generation unit generates the setting screen corresponding to one of the at least one item having highest relationship with the designated keyword.

10. The device according to claim 1, further comprising:
an item type judgment unit configured to make a judgment regarding a type of the at least one item searched by the search unit; and
a control unit configured to control the setting screen generation unit to generate the setting screen when the item type judgment unit judges that the type of the at least one item corresponds to a setting item, and to execute a process corresponding to the at least one item when the item type judgment unit judges that the type of the at least one item corresponds to a processing item.

11. The device according to claim 10, further comprising:
a list generation unit configured to generate a setting item list in which the at least one item searched by the search unit is listed; and
a display unit configured to display the setting item list generated by the list generation unit,
wherein the item type judgment unit makes a judgment regarding a type of the at least one item with respect to a particular item selected by a user from the at least one item displayed in the setting item list.

12. The device according to claim 1, wherein the keyword is inputted by a user operation.

13. The device according to claim 1,
wherein the setting screen generation unit calculates an area size to display the entire setting screen by using area sizes of contents to be arranged in the setting screen, and generates the setting screen having the calculated area size.

14. A device, comprising:
a storage unit configured to store a plurality of items and parameters associated with the plurality of items, the plurality of items relating to setting of a target device;
a search unit configured to search the storage unit, by using a keyword, for at least one item that matches the keyword, the keyword being input by a user; and
a process execution unit configured to execute a process corresponding to the at least one item found by the search unit when the at least one item is found by the search unit, in accordance with the parameters corresponding to the found at least one item, wherein:
the storage unit stores an operation type associated with each of the plurality of items, and
the device further comprises:
an execution type judgment unit configured to judge regarding the operation type corresponding to the at least one setting item searched by the search unit; and
a control unit configured to control a setting screen generation unit to generate a setting screen when the execution type judgment unit judges that the operation type corresponding to the at least one setting item searched by the search unit indicates that the setting screen should be generated, and to control the process execution unit to execute the process without causing the setting screen generation unit to generate the setting screen when the execution type judgment unit judges that the operation type corresponding to the at least one setting item searched by the search unit indicates that the process should be executed.

15. The device according to claim 14, wherein:
the plurality of items stored in the storage unit includes a plurality of processing items;
the search unit searches for at least one processing item matching the keyword; and
the processing unit executes the process corresponding to the at least one process item searched by the search unit.

16. A computer readable medium having computer readable instructions stored thereon, the instructions, when executed by a computer, causing the computer to:
store a plurality of items and parameters associated with the plurality of items in a storage unit, the plurality of items relating to setting of a target device;

search the storage unit, by using a keyword, for at least one item of the plurality of items matching the keyword, the keyword being input by a user;

generate a setting screen, when the at least one item is found by the search, using the parameters corresponding to the found at least one item;

execute an operation corresponding to the searched at least one item in accordance with the parameters corresponding to the searched at least one item;

store operation types in the storage unit such that the operation types are respectively associated with the plurality of items;

judge regarding an operation type of the operation types corresponding to the searched at least one item;

generate the setting screen when it is judged that the operation type corresponding to the searched at least one setting item indicates that the setting screen should be generated; and execute the operation when it is judged that the operation type corresponding to the searched at least one setting item indicates that the operation should be executed.

17. A computer readable medium having computer readable instructions stored thereon, the instructions, when executed by a computer, causing the computer to:

store a plurality of items and parameters associated with the plurality of items in a storage unit, the plurality of items relating to setting of a target device;

search the parameters stored in the storage unit, by using a keyword, for at least one item of the plurality of items matching the keyword, the keyword being input by a user;

execute a process corresponding to the searched at least one item when the at least one item is found by the search, in accordance with the parameters corresponding to the found at least one item;

store operation types in the storage unit such that the operation types are respectively associated with the plurality of items;

judge regarding an operation type of the operation types corresponding to the searched at least one item;

generate a setting screen when it is judged that the operation type corresponding to the searched at least one setting item indicates that the setting screen should be generated; and execute the process when it is judged that the operation type corresponding to the searched at least one setting item indicates that the process should be executed.

* * * * *